US011172440B2

(12) United States Patent
Tov et al.

(10) Patent No.: US 11,172,440 B2
(45) Date of Patent: Nov. 9, 2021

(54) SYSTEM AND METHOD FOR VIRTUAL LOW POWER WIDE AREA NETWORK NODES IN A LOW POWER WIDE AREA NETWORK GATEWAY

(71) Applicant: MOTOROLA SOLUTIONS, INC., Chicago, IL (US)

(72) Inventors: Jacob Shem Tov, Jerusalem (IL); Ido Merkado, Tel Aviv-Jaffa (IL); Gonen Peleg Dahan, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 88 days.

(21) Appl. No.: 16/690,300

(22) Filed: Nov. 21, 2019

(65) Prior Publication Data
US 2021/0160772 A1  May 27, 2021

(51) Int. Cl.
*H04W 52/02* (2009.01)
*H04L 12/24* (2006.01)
*H04W 88/16* (2009.01)
*H04L 29/08* (2006.01)
*H04L 29/06* (2006.01)

(52) U.S. Cl.
CPC ......... *H04W 52/0203* (2013.01); *H04L 41/12* (2013.01); *H04L 67/12* (2013.01); *H04L 69/08* (2013.01); *H04W 88/16* (2013.01)

(58) Field of Classification Search
None
See application file for complete search history.

(56) References Cited

U.S. PATENT DOCUMENTS

| 10,805,155 | B1* | 10/2020 | Le ....................... H04L 12/2832 |
| 2018/0063250 | A1 | 3/2018 | Justin et al. |
| 2018/0139274 | A1* | 5/2018 | Gandhi ............... H04L 67/2804 |
| 2019/0044793 | A1 | 2/2019 | Chew |
| 2019/0045033 | A1* | 2/2019 | Agerstam ............. H04L 63/101 |
| 2019/0109891 | A1 | 4/2019 | Paruchuri et al. |

FOREIGN PATENT DOCUMENTS

WO    2018183789 A1    10/2018

* cited by examiner

*Primary Examiner* — Ajit Patel
*Assistant Examiner* — Keith Follansbee

(57) ABSTRACT

In one aspect, a method for enabling wired sensors to be coupled to a Low Power Wide Area Network (LPWAN) is provided. A first wired device that is coupled to the LPWAN gateway device via a first wired medium may be identified at a LPWAN gateway device. A first virtual node may be instantiated at the LPWAN gateway device, the first virtual node assigned to provide protocol conversion between the LPWAN and the first wired device. A request to join the LPWAN as a node that does not require Radio Frequency (RF) management may be transmitted from the first virtual node at the LPWAN gateway.

17 Claims, 5 Drawing Sheets

SYSTEM AND METHOD FOR VIRTUAL LOW POWER WIDE AREA NETWORK NODES IN A LOW POWER WIDE AREA NETWORK GATEWAY

BACKGROUND

The advent of inexpensive, low power, wireless networking circuitry has made it economically feasible to connect almost any device to a network, such as the Internet. The range of devices that can be connected are virtually unlimited. The Internet of Things (IoT) generally includes devices that may not necessarily be associated with a particular user. For example, devices such as sensors and actuators may be wirelessly connected to allow those sensors to be read or the actuators to be activated remotely. For example, in a wastewater collection context, there may be multiple rainfall detection/measurement sensors. These sensors may wirelessly connect to a network via a wireless Low Power Wide Area Network (LPWAN). One popular example of a wireless LPWAN is the Long Range Wide Area Network (LoRaWAN). A LoRaWAN may use the Long Range (LoRa) protocol at the physical layer of the wireless connection. An application that manages the wastewater collection system may utilize the LoRaWAN to obtain data related to rainfall from the wirelessly connected rainfall sensor.

In order to operate at low power, LPWANs may operate using gateways that are distributed throughout a coverage region. Devices, also referred to as nodes, connecting to the LPWAN may wirelessly connect to the gateway that requires the least amount of power to be used for the connection. This is generally, although not necessarily, the gateway that is physically closest to the device. Each LPWAN gateway may connect with one or more devices. The LPWAN gateway may have a backhaul connection (e.g. wired, microwave, etc.) to the network. Given the need for low power, an application in the network may manage radio frequency (RF) power usage of the LPWAN devices connected to the gateways in order to reduce the amount of power consumed for wireless communication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
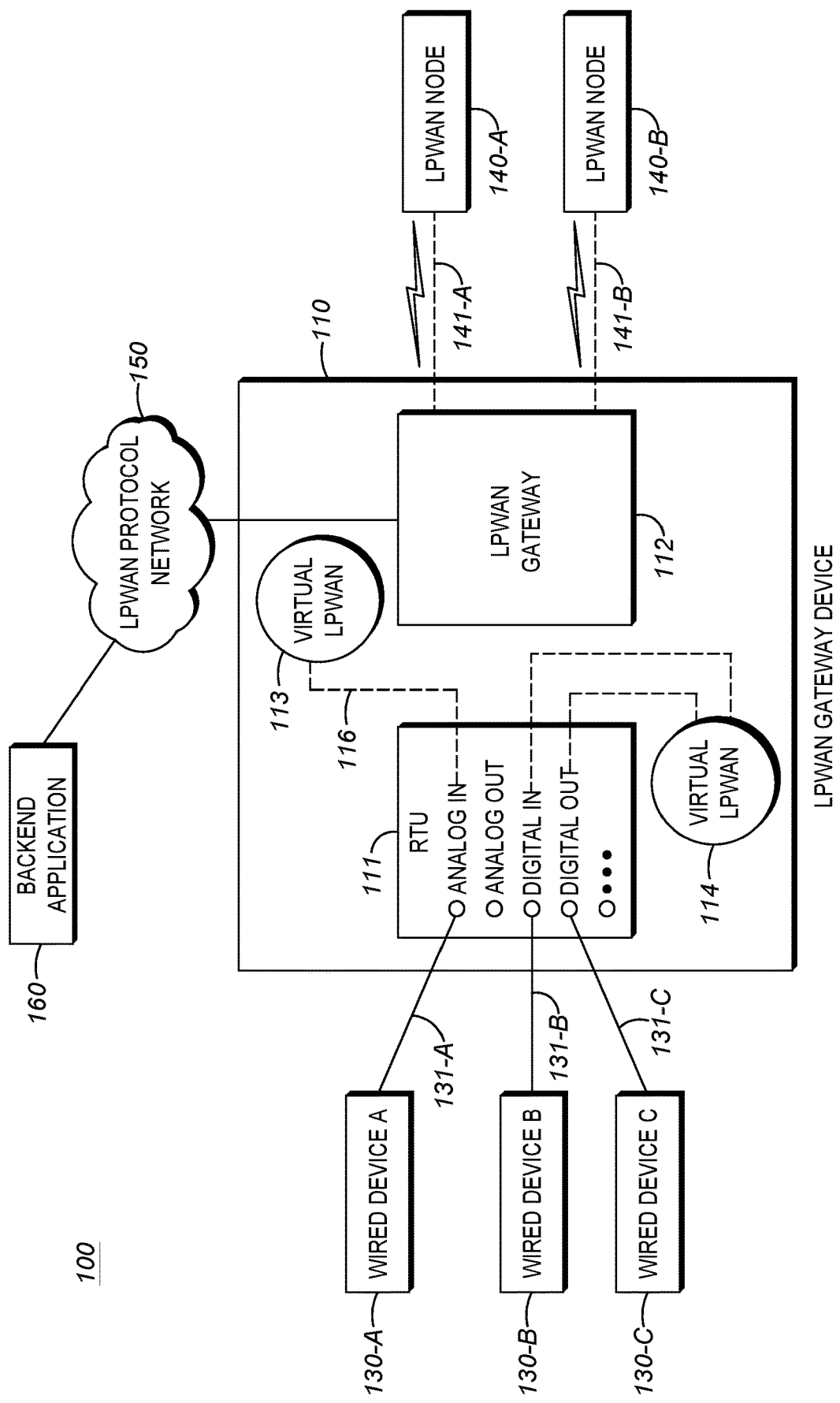
FIG. 1 is an example of a system that may utilize the virtual LPWAN nodes in a LPWAN gateway techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Using LPWAN gateways to act as a concentrator for LPWAN nodes provides an efficient way for communications between the LPWAN nodes and the network to be concentrated into a smaller number of backhaul links. Each gateway may support many LPWAN wireless nodes, and provide backhaul facilities for those nodes. Thus, each LPWAN node need only concern itself with communication with the LPWAN gateway, while the LPWAN gateway manages communication with the network.

An LPWAN gateway may also offer additional functionality that is not part of the LPWAN. For example, an LPWAN gateway may also include the functionality of a remote terminal unit (RTU) that allows for the connection of wired devices, such as wired sensors and actuators. These wired devices may not be LPWAN capable/compatible devices. In many cases, these wired devices may use protocols associated with wired communications media (e.g. digital input/output signal lines, analog input/output signal lines, Modbus protocol, etc.). In addition to wired devices, an RTU may provide other wireless capabilities that are not considered LPWAN capabilities because they are short range. For example, Bluetooth Low Energy (BLE) and WiFi. For ease of description, the remainder of the disclosure will refer to wired devices but this should be understood to include both devices wired to the RTU as well as devices that are wirelessly connected to the RTU via non-LPWAN mechanisms.

For example, in the wastewater collection context described above, a gateway may provide a wireless access point for a LPWAN node that acts as rainfall detection sensor. In addition, the gateway may include RTU functionality that allows the gateway to directly connect to wired devices. For example, in the wastewater collection example, there may be a water pump that is directly wired to the RTU capabilities of the gateway and the pump can be turned on or off via a remote application.

A problem arises in that the LPWAN Gateway that includes RTU functionality needs to enable multiple communications protocols. As explained above, LPWAN nodes typically use an LPWAN protocol, such as LoRa, to communicate with backend control applications. The LPWAN protocols generally include capabilities for RF power management. On the other hand, wired devices connected to an RTU typically communicate via different protocols. For example, RTUs connected to wired devices may communicate with a backend control application via the Supervisory Control and Data Acquisition (SCADA) protocol which does not require RF power management. Maintaining two separate communications channels (e.g. one using an LPWAN protocol, one using SCADA protocol) may not be an efficient use of resources on the gateway. Furthermore, a backend application that deals with both wireless LPWAN nodes and wired RTU nodes must maintain separate communications protocol stacks to handle communication with each of those two type of devices.

The techniques described herein overcome these problems individually and collectively. A gateway that includes both LPWAN and RTU functionality may provide backhaul capabilities for LPWAN nodes using normal LPWAN protocols. For wired devices, the gateway may create one or more virtual LPWAN nodes. A wired device may communicate with a virtual LPWAN node using the protocol that would normally be used over a wired connection. The virtual LPWAN node may then join the LPWAN protocol network as a type of node that does not require RF power management, because the virtual LPWAN node is not a wireless node. Communication with a backend application can then occur using the LPWAN protocol. The backend application need not be aware that there are devices that are physically wired to the RTU capabilities of the gateway. As far as the backend application is concerned, all nodes appear to be LPWAN nodes.

A method for enabling wired sensors to be coupled to a Low Power Wide Area Network (LPWAN) is provided. The method may comprise identifying, at a LPWAN gateway device, a first wired device that is coupled to the LPWAN gateway device via a first wired medium. The method may further comprise instantiating, at the LPWAN gateway device, a first virtual node, the first virtual node assigned to provide protocol conversion between the LPWAN and the first wired device. The method may further comprise transmitting from the first virtual node at the LPWAN gateway, a request to join the LPWAN as a node that does not require Radio Frequency (RF) management.

In one aspect, the LPWAN may be a Long Range Wide Area Network (LoRaWAN). In one aspect, the method may further comprise receiving, at the first virtual node, from the LPWAN, a control message for the first wired device via a LPWAN protocol, converting, by the first virtual node, the control message to a wired protocol used by the first wired device over the first wired medium, and sending the converted control message to the first wired device via the first wired medium.

In one aspect, the method may further comprise receiving, at the first virtual node, a device data message from the first wired device via a first wired protocol over the first wired medium, converting, by the first virtual node, the device data message from the first wired device to a LPWAN protocol, and sending the converted device data message to the LPWAN.

In one aspect, the method may further comprise identifying, at the LPWAN gateway device, a second wired device that is coupled to the LPWAN gateway device via a second wired medium, instantiating, at the LPWAN gateway device, a second virtual node, the second virtual node assigned to provide protocol conversion between the LPWAN and the second wired device, and transmitting, from the second virtual node at the LPWAN gateway, a request to join the LPWAN as a node that does not require Radio Frequency (RF) management.

In one aspect, the method may further comprise identifying, at the LPWAN gateway device, a second wired device that is coupled to the LPWAN gateway device via a second wired medium, associating the second wired device with the first virtual node, receiving, at the first virtual node, from the LPWAN, a control message, determining if the control message is destined for the first wired device or the second wired device, converting the control message to a first wired protocol or a second wired protocol based on the determination, and sending the converted control message to the first wired device or the second wired device over the first wired medium or second wired medium based on the determination.

In one aspect, the method may further comprise identifying, at the LPWAN gateway device, a second wired device that is coupled to the LPWAN gateway device via a second wired medium, associating the second wired device with the first virtual node, receiving, at the first virtual node, a device data message from one of the first wired device or the second wired device via one of the first wired medium or the second wired medium, converting, by the first virtual node, the data message to a LPWAN protocol, wherein the converted data message includes an indication of which of the first wired device or the second wired device the data message was received from, and sending the converted data message to the LPWAN.

A system is provided. The system may include a processor and a memory coupled to the processor. The memory may contain thereon a set of instructions that when executed by the processor cause the processor to identify, at a LPWAN gateway device, a first wired device that is coupled to the LPWAN gateway device via a first wired medium. The instructions may further cause the processor to instantiate, at the LPWAN gateway device, a first virtual node, the first virtual node assigned to provide protocol conversion between the LPWAN and the first wired device. The instructions may further cause the processor to transmit from the first virtual node at the LPWAN gateway, a request to join the LPWAN as a node that does not require Radio Frequency (RF) management.

In one aspect, the LPWAN may be a Long Range Wide Area Network (LoRaWAN). In one aspect the instructions may further cause the processor to receive, at the first virtual node, from the LPWAN, a control message for the first wired device via a LPWAN protocol, convert, by the first virtual node, the control message to a wired protocol used by the first wired device over the first wired medium, and send the converted control message to the first wired device via the first wired medium.

In one aspect the instructions may further cause the processor to receive, at the first virtual node, a device data message from the first wired device via a first wired protocol over the first wired medium, convert, by the first virtual node, the device data message from the first wired device to a LPWAN protocol, and send the converted device data message to the LPWAN.

In one aspect the instructions may further cause the processor to identify, at the LPWAN gateway device, a second wired device that is coupled to the LPWAN gateway device via a second wired medium, instantiate, at the LPWAN gateway device, a second virtual node, the second virtual node assigned to provide protocol conversion between the LPWAN and the second wired device, and transmit, from the second virtual node at the LPWAN gateway, a request to join the LPWAN as a node that does not require Radio Frequency (RF) management.

In one aspect the instructions may further cause the processor to identify, at the LPWAN gateway device, a second wired device that is coupled to the LPWAN gateway device via a second wired medium, associate the second wired device with the first virtual node, receive, at the first virtual node, from the LPWAN, a control message, determine if the control message is destined for the first wired device or the second wired device, convert the control message to a first wired protocol or a second wired protocol based on the determination, and send the converted control message to the first wired device or the second wired device over the first wired medium or second wired medium based on the determination.

In one aspect the instructions may further cause the processor to identify, at the LPWAN gateway device, a second wired device that is coupled to the LPWAN gateway device via a second wired medium, associate the second wired device with the first virtual node, receive, at the first virtual node, a device data message from one of the first wired device or the second wired device via one of the first wired medium or the second wired medium, convert, by the first virtual node, the data message to a LPWAN protocol, wherein the converted data message includes an indication of which of the first wired device or the second wired device the data message was received from, and send the converted data message to the LPWAN.

A non-transitory processor readable medium containing a set of instructions thereon is provided. When executed by a processor the instructions may cause the processor to identify, at a LPWAN gateway device, a first wired device that is coupled to the LPWAN gateway device via a first wired medium. The instructions may further cause the processor to instantiate, at the LPWAN gateway device, a first virtual node, the first virtual node assigned to provide protocol conversion between the LPWAN and the first wired device. The instructions may further cause the processor to transmit from the first virtual node at the LPWAN gateway, a request to join the LPWAN as a node that does not require Radio Frequency (RF) management.

In one aspect, the instructions contained on the medium may further cause the processor to receive, at the first virtual node, from the LPWAN, a control message for the first wired device via a LPWAN protocol, convert, by the first virtual node, the control message to a wired protocol used by the first wired device over the first wired medium, and send the converted control message to the first wired device via the first wired medium.

In one aspect, the instructions contained on the medium may further cause the processor to receive, at the first virtual node, a device data message from the first wired device via a first wired protocol over the first wired medium, convert, by the first virtual node, the device data message from the first wired device to a LPWAN protocol, and send the converted device data message to the LPWAN.

In one aspect, the instructions contained on the medium may further cause the processor to identify, at the LPWAN gateway device, a second wired device that is coupled to the LPWAN gateway device via a second wired medium, instantiate, at the LPWAN gateway device, a second virtual node, the second virtual node assigned to provide protocol conversion between the LPWAN and the second wired device, and transmit, from the second virtual node at the LPWAN gateway, a request to join the LPWAN as a node that does not require Radio Frequency (RF) management.

In one aspect, the instructions contained on the medium may further cause the processor to identify, at the LPWAN gateway device, a second wired device that is coupled to the LPWAN gateway device via a second wired medium, associate the second wired device with the first virtual node, receive, at the first virtual node, from the LPWAN, a control message, determine if the control message is destined for the first wired device or the second wired device, convert the control message to a first wired protocol or a second wired protocol based on the determination, and send the converted control message to the first wired device or the second wired device over the first wired medium or second wired medium based on the determination.

In one aspect, the instructions contained on the medium may further cause the processor to identify, at the LPWAN gateway device, a second wired device that is coupled to the LPWAN gateway device via a second wired medium, associate the second wired device with the first virtual node, receive, at the first virtual node, a device data message from one of the first wired device or the second wired device via one of the first wired medium or the second wired medium, convert, by the first virtual node, the data message to a LPWAN protocol, wherein the converted data message includes an indication of which of the first wired device or the second wired device the data message was received from, and send the converted data message to the LPWAN.

FIG. 1 is an example of a system that may utilize the virtual LPWAN nodes in a LPWAN gateway techniques described herein. System 100 may include LPWAN Gateway device 110, a plurality of wired devices 130, a plurality of LPWAN nodes 140, a LPWAN protocol network 150, and a backend application 160.

LPWAN Gateway device 110 may generally provide two separate pieces of functionality. The first piece of functionality may be that of a RTU 111. An RTU may provide the ability to connect to wired devices, such as wired devices 130. An RTU may interface to devices in the physical world via a wired connection (or, as mentioned above via a non-LPWAN wireless connection). For example, an RTU may include digital inputs to receive digital input signals (e.g. measurements, etc.), digital outputs to output digital signals (e.g. to control external devices), analog inputs to receive analog input signals (e.g. analog measurements, etc.), analog outputs to output analog signals (e.g. to control external devices).

Traditional RTUs may also include communications capabilities that allow for the RTU to communicate with a backend application 160 via a variety of SCADA type protocols (e.g. Modbus, etc.). As will be explained in further detail below, the techniques described herein allow for communication with wired devices via LPWAN protocols, thus obviating the need to communicate with SCADA type protocols. What should be understood is that in the present disclosure, the RTU functionality is used for communicating with wired devices but it not used for communicating with the backend application.

The second piece of functionality provided by the LPWAN Gateway device 110 may be the functionality of a traditional LPWAN Gateway 112. An LPWAN gateway may be used as a wireless access point for LPWAN nodes within the coverage area of the LPWAN Gateway. The LPWAN Gateway may include transceivers that allow for communication with wireless LPWAN nodes using LPWAN protocols, such as the LoRa protocol. The LPWAN gateway may provide the ability to communicate via a LPWAN protocol network 150 to a backend application 160.

Wired devices 130A-C may be any type of device that may be connected via a wired medium 131-A-C to RTU 111. Wired devices 130 may be sensors that measure some physical property of the real world. Some examples may include temperature sensors, pressure sensors, rainfall sensors, position sensors (e.g. open/closed), or any other type of sensor. Sensors may be analog sensors which report measurements via an analog signal or digital sensors which report measurements via a digital signal. The techniques described herein are not dependent on a wired device being any particular type of sensor, so long as it is connected to the RTU via a wired connection using any form of wired protocol.

Wired devices 130 may be actuators that control some physical activity in the real world. For example, an actuator may be a motor, a pump, an electronically controlled valve, etc. The actuator may be controlled via an analog or a digital signal via a wired connection over a wired medium 131-A-C to the RTU. The connection may use any form of wired protocol. The techniques described herein are not dependent on a wired device being any particular type of actuator, so long as it is connected to the RTU via a wired connection using any form of wired protocol. For ease of description, wired sensors and actuators will be generically referred to as wired devices. However, it should be understood that the devices could be sensors, actuators, or a combination thereof.

LPWAN nodes 140-A,B may be traditional LPWAN nodes that connect wirelessly to the LPWAN Gateway 112 via wireless connections 141-A,B utilizing LPWAN protocols. For example, LPWAN nodes 140-A,B may implement the LoRa protocol and communicate with a backend application 160 via LPWAN protocol network 150. Each LPWAN node may be addressed using the addressing scheme of the LPWAN protocol network. What should be noted is that the RF management of LPWAN nodes 140-A,B may be controlled by the LPWAN protocol network 150 or the backend application. RF management may include controlling various RF parameters such as output power, frequency, spreading factors, timing, etc. What should also be understood is that when LPWAN nodes 140-A,B join the LPWAN protocol network 150, the nodes receive RF management instructions from a source external to the node itself (e.g. from the network, from the backend application, etc.).

LPWAN nodes 140-A,B may be any type of sensor or actuator that has implemented an LPWAN protocol. In the example presented above, a rainfall detection sensor may be a LPWAN node that wirelessly connects to the LPWAN gateway 112. The techniques described herein do not alter the mode of operation of wireless LPWAN nodes.

LPWAN protocol network 150 may be any type of wired or wireless network that can be used to send data using a LPWAN protocol. For example, the network may be a Long Term Evolution (LTE) network, an Ethernet network, a Wi-Fi network, etc. The techniques described herein are not dependent on any particular type of network that is used to connect the LPWAN Gateway 112 to the backend application 160. Any network capable of utilizing a LPWAN protocol to connect the LPWAN Gateway 112 and the backend application are suitable for use with the techniques described herein.

Backend application 160 may be any application that utilizes input from/sends commands to LPWAN devices. For example, in the case of the wastewater treatment example, part of the backend application functionality may be to retrieve rainfall data from a LPWAN node that includes a rainfall sensor. The techniques described herein are not dependent on any particular type of backend application. What should be understood is that the backend application communicates with LPWAN nodes as well as Virtual LPWAN node (described in further detail below) via the LPWAN Protocol Network through the LPWAN Gateway 112 functionality provided by the LPWAN Gateway Device 110.

In operation, the LPWAN nodes 140 may connect to the LPWAN Gateway 112 using traditional LPWAN protocols. The LPWAN nodes may then communicate with a backend application 160 via the LPWAN protocol network using the addressing scheme associated with the LPWAN protocol network. The techniques described herein do not modify operation of traditional LPWAN Nodes.

The wired devices are not generally compatible with LPWAN protocols. In order to overcome this problem, a virtual LPWAN node is created. The virtual LPWAN node may be a software process that receives communications from wired devices via wired medium using wired protocols and converts those communications to LPWAN compatible protocols, and vice verso.

For example, virtual LPWAN node 113 may be instantiated to provide LPWAN communications capabilities to wired device 130-A. Virtual LPWAN node 113 may communicate with the RTU functionality via link 116 which may use any number of suitable technologies. For example, the link 116 could be a shared memory implementation in which the RTU writes data from wired device 130-A into a memory location and then the Virtual LPWAN node 113 is a software process that reads form that memory location. In another implementation, the RTU functionality may be modeled as a software process and the RTU process and the Virtual LPWAN communicate via interprocess communications. The specific implementation is relatively unimportant. What should be understood is that the virtual LPWAN node 113 is able to send information to/receive information from the wired device 130A using the wired device protocols.

Virtual LPWAN node 113 may then join LPWAN protocol network 150 as a node that does not require RF management (unlike regular LPWAN nodes). The reason for this is that the devices connected to the virtual LPWAN nodes are not wireless devices and thus have no need for RF management. Furthermore, the virtual LPWAN node may be addressed by the LPWAN protocol network using the addressing scheme in use for the LPWAN protocol network. In other words, to the LPWAN protocol network, the virtual LPWAN node is addressed just as if it were a real LPWAN node.

Virtual LPWAN node 113 may then convert messages from the wired device 130-A into a LPWAN protocol and send them to the backend application 160 via the LPWAN protocol network 150. Messages from the backend application destined for wired device 130-A may be sent to the virtual LPWAN node via the LPWAN Protocol network. The virtual LPWAN node may then convert the message from the LPWAN protocol to the wired protocol. Neither the LPWAN protocol network nor the backend application need be aware that device 130-A is a wired device and is not actually a wireless LPWAN node.

There may generally be two forms of messages with respect to wired devices. The first type may be control messages, which are generally used when the wired device is an actuator. Control messages may be used to actuate a wired device that is an actuator. The second type of message may be a device data message that is typically used when the wired device is a sensor. The sensor may report data (e.g. whatever the sensor is designed to measure) via a device data message.

Virtual LPWAN node 113 is described as having a one to one relationship with wired device 130-A. However, it should be understood that a virtual LPWAN node may be associated with multiple wired devices. For example, virtual node 114 may be associated with both wired device 130-B, C. Messages from those devices may be converted from the wired protocol to the LPWAN protocol, and vice versa. An indication of which device generated/is the destination for the message can be included in the LPWAN protocol message to indicate which device the communication is associated with.

Figure 2:
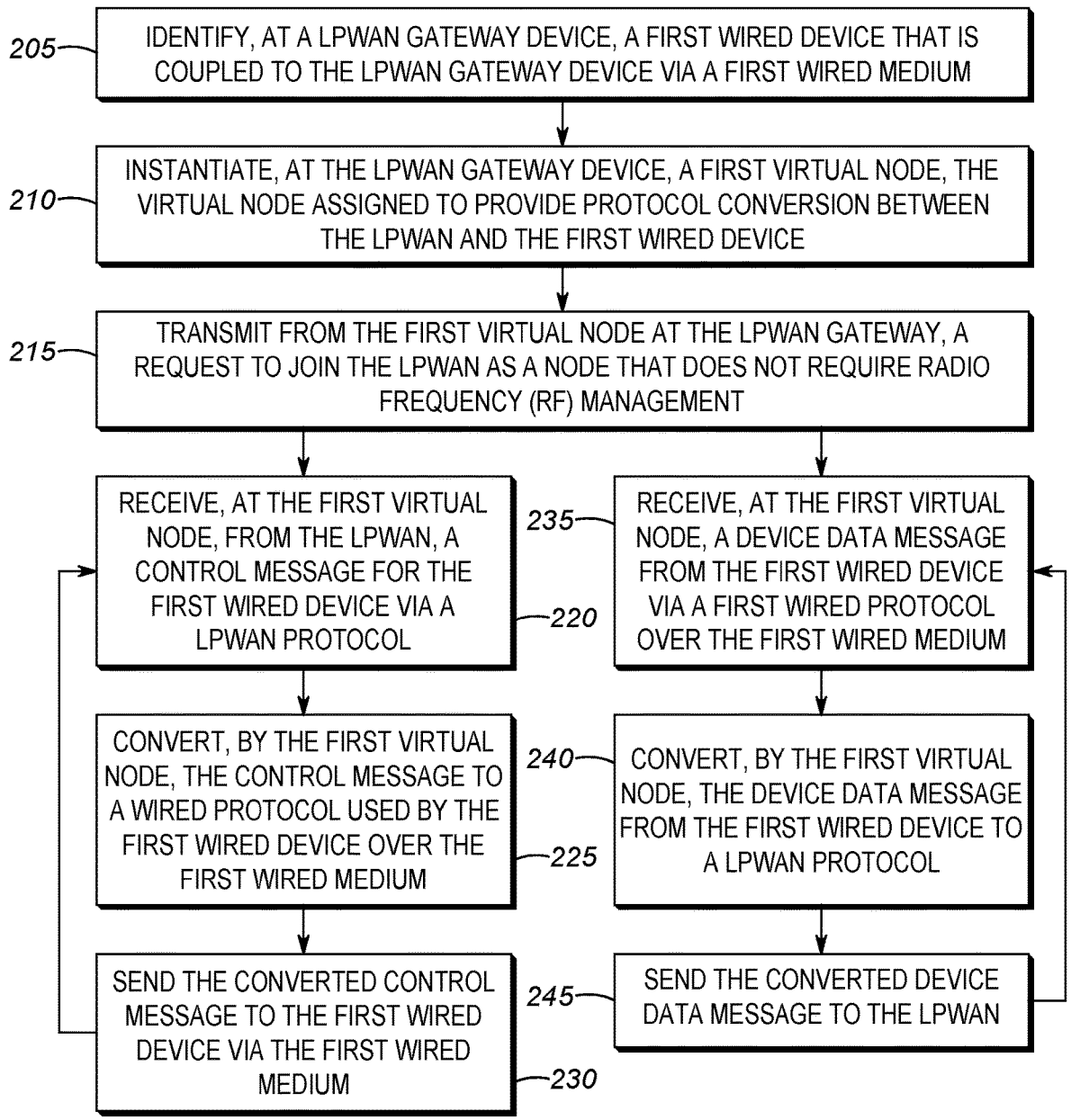
FIG. 2 is an example of a flow diagram for using virtual LPWAN nodes in a LPWAN gateway device.

FIG. 2 is an example of a flow diagram for using virtual LPWAN nodes in a LPWAN gateway device. In block 205, a first wired device that is coupled to the LPWAN gateway device via a first wired medium may be identified. The wired device may be any type of sensor or actuator, so long as it is coupled via wire to the LPWAN Gateway device 110. For example, the first wired device may be coupled to the LPWAN Gateway device via the RTU functionality of the LPWAN Gateway device.

In block 210, a first virtual node may be instantiated at the LPWAN gateway device 110. The first virtual node may be assigned to provide protocol conversion between the LPWAN and the first wired device. As explained above, the first device may utilize a wired protocol over the first wired medium. The first virtual node may be utilized to convert sensor reading/actuator commands from the protocol used over the wired medium to/from the LPWAN protocol.

In block 215, a request to join the LPWAN as a node that does not require Radio Frequency (RF) management may be transmitted from the first virtual node at the LPWAN Gateway Device 110. In a conventional LPWAN protocol network, the network (or an application within the network) is responsible for RF management of the nodes. This may include things such as defining frequencies to use, spreading factors, RF power, etc. As such, traditional LPWAN protocol networks would expect to perform RF management for any nodes that join the LPWAN. Because the virtual nodes represent wired devices that do not communicate via RF, the new join request that indicates RF management is not required notifies the LPWAN protocol network that there is no associated RF link to the devices being handled by the first virtual node.

As mentioned above, the techniques described herein are applicable to any form of LPWAN protocol network. One particular example is a LoRaWAN network. However, it should be understood that a LoRaWAN network is mentioned as one example type of LPWAN. The techniques described herein may be utilized may any current or future developed LPWAN technology.

In block 220, a control message for the first wired device may be received, from the LPWAN, via a LPWAN protocol, at the first virtual node. As explained above, the LPWAN protocol network 150 operates using LPWAN protocols. From the perspective of the LPWAN protocol network, it is simply passing a control message (e.g. command to an actuator) to what appears to be a regular LPWAN node. The network itself is not aware that the actuator is not a wireless LPWAN node but rather is a wired device.

In block 225, the first virtual node may convert the control message to a wired protocol used by the first wired device over the first wired medium. As explained above, the wired device is not aware that it is connected to a virtual LPWAN node. From the wire devices perspective, it is simply communicating with the RTU functionality of the LPWAN gateway device. The first virtual node may convert between the LPWAN and the wired protocols.

In block 230, the converted control message may be set to the first wired device via the first wired medium. For example, the first virtual node may send the converted control message to the RTU functionality of the LPWAN Gateway Device 110. The RTU may receive the converted control message and transmit that control message via wired protocol on the wired medium connecting the wired device to the RTU. The wired device may then perform whatever action was specified in the control message. The process may then repeat whenever a new control message is received.

In block 235, a device data message may be received, from the first wired device via a first wired protocol over the first wired medium, at the first virtual node. For example, the first wired device may be a sensor that has a measurement to report. The first wired device may utilize a wired medium to communicate via a wired protocol with the RTU functionality of the LPWAN Gateway device. The RTU functionality may cause the data message to be sent to the first virtual node.

In block 240, the first virtual node may convert the device data message from the first wired device to a LPWAN protocol. As explained above, the LPWAN protocol network 150 expects to communicate with an LPWAN protocol, which may be different that the protocol used on the first wired medium. The first virtual node may convert the device data message such that it appears to the LPWAN protocol network that the device data message came from a conventional LPWAN node.

In block 245, the converted device data message may be sent to the LPWAN. From the perspective of the LPWAN protocol network 150, the device data message appears to have originated from a conventional LPWAN node. Neither the LPWAN protocol network 150 nor the backend application 160 need be aware that the device data message originated from a virtual LPWAN node. As far as those elements are concerned, the device data message appears to have originated from a conventional LPWAN node.

Figure 3:
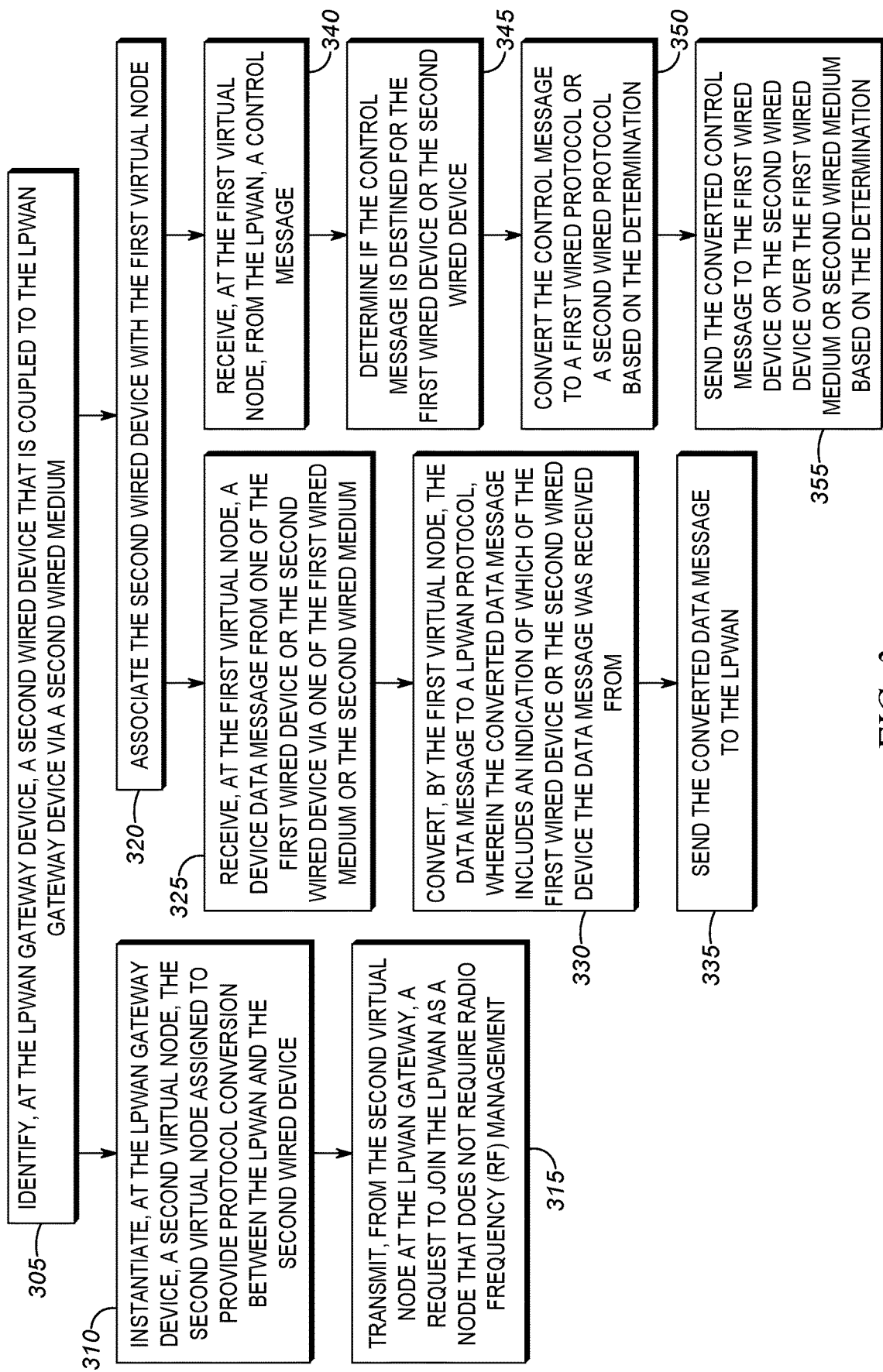
FIG. 3 is an example of a flow diagram for including more than one wired device when using virtual LPWAN nodes in a LPWAN gateway.

FIG. 3 is an example of a flow diagram for including more than one wired device when using virtual LPWAN nodes in a LPWAN gateway. As described above, each LPWAN Gateway device may be coupled to more than one wired device. In some cases, separate virtual LPWAN nodes may be instantiated for each individual wired device. In other cases, multiple wired devices may be handled by a single virtual LPWAN node, and that node may use information carried within the message to differentiate between the actual physical wired device that the message is destined for and/or coming from.

In block 305, a second wired device that is coupled to the LPWAN gateway device via a second wired medium may be identified at the LPWAN gateway device. It should be noted that in some cases the second wired device may be a physically separate device from the first device. For example, in the wastewater collection example, there may be two separate rainfall detectors. In other cases, the same physical device may provide multiple independent wired connections. For example, a single device may include a rainfall detector and a temperature sensor, each with their own wired connection. What should be understood is that the second wired device has a second wired medium utilizing a second wired protocol (although the first and second wired protocol may be the same, they are utilized over separate first and second wired media).

In the case where each wired device has its own virtual LPWAN node, in block 310 a second virtual node, the second virtual node assigned to provide protocol conversion between the LPWAN and the second wired device may be instantiated at the LPWAN gateway device. In block 315, a request to join the LPWAN as a node that does not require Radio Frequency (RF) management may be transmitted from the second virtual node at the LPWAN gateway. As should be clear, the operations in blocks 305-315 are very similar to those in blocks 205-215, as the two different virtual nodes effectively operate as completely independent devices.

In some cases, a second wired device may be associated with a virtual LPWAN node that is associated with a first wired device. In block 320, the second wired device may be associated with the first virtual node (e.g. the virtual node created in block 210.

In block 325, a device data message from one of the first wired device or the second wired device via one of the first wired medium or the second wired medium may be received at the first virtual node. As described above, a device data message may include data that is being sent from the wired device (e.g. wired device acting as a sensor) to the backend application via an LPWAN protocol network.

In block 330 the first virtual node may convert the data message to a LPWAN protocol. The converted data message includes an indication of which of the first wired device or the second wired device the data message was received from. As explained above, a traditional LPWAN node may include multiple data channels, all associated with the same physical LPWAN node. A virtual LPWAN node may map each individual wired device to one of those channels, thus allowing the backend application to determine which wired device originated a data message by examining which LPWAN channel the data message was mapped to. Thus, in some implementations, the indication of which wired device originated the message is based on the channel it is mapped to. It should be understood that other implementations may utilize different techniques, such as including a value in the message indicating which wired device originated the device data message.

In block 335, the converted message may be sent to the LPWAN. Once sent, the converted message may travers the LPWAN protocol network like a message sent from a traditional LPWAN node. The message may be received by the backend application just as any other message that was generated from a traditional LPWAN node. Depending on the function of the backend application, it may determine a channel that was contained in the LPWAN message and map the received data message to the physical wired device associated with that channel.

In block 340, a control message may be received from the LPWAN at the first virtual node. For example, the backend application may wish to control an actuator that is connected to the RTU functionality of the LPWAN gateway device. The backend application may send a control message using an LPWAN protocol over the LPWAN protocol network to the first virtual node. From the perspective of the backend application, it is simply sending an LPWAN protocol message to a real LPWAN node, and need not be aware that the message is actually destined for a virtual LPWAN node.

In block 345, it may be determined if the control message is destined for the first wired device or the second wired device. As mentioned above, a traditional LPWAN node may have multiple channels. Each wired device may be mapped to one of those channels. A control message destined for a specific LPWAN channel at the virtual LPWAN node may then be routed to the proper wired device.

In block 350, the control message may be converted to a first wired protocol or a second wired protocol based on the determination in block 345. Even though two wired devices may be handled by the same virtual LPWAN node does not mean they need to use the same wired protocol. As explained above, one weird device may utilize a first wired protocol (e.g. RS232), while another wired device may utilize a different wired protocol (e.g. serial peripheral interface).

In block 355 the converted control message may be sent to the first wired device or the second wired device over the first wired medium or the second wired medium based on the determination. In other words, once the virtual LPWAN node determines which wired device the control message is intended for, the virtual LPWAN node sends the message to that device using the appropriate wired protocol.

Figure 4:
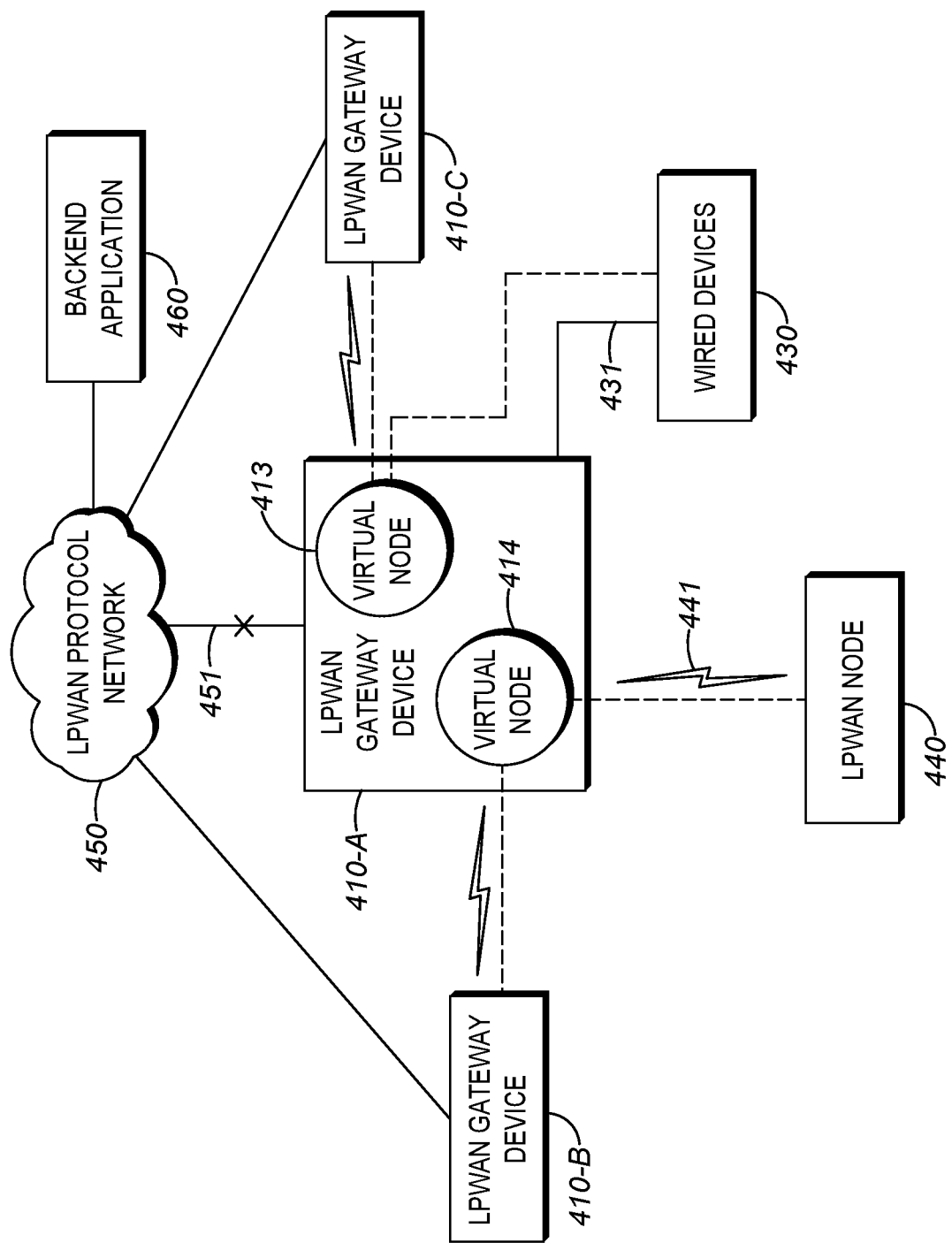
FIG. 4 is an example of using virtual LPWAN nodes in an LPWAN gateway to provide communications capabilities when a backhaul to an LPWAN gateway fails.

FIG. 4 is an example of using virtual LPWAN nodes in an LPWAN gateway to provide communications capabilities when a backhaul to an LPWAN gateway fails. FIG. 4 includes LPWAN Gateway devices 410(A-C), wired device 430, LPWAN node 440, LPWAN protocol network 450 and Backend application 460. LPWAN protocol network 450 and backend application 460 are similar to elements 150 and 160 and the description of those elements is not repeated for ease of description.

As shown, the backhaul connection 451 from LPWAN Gateway device 410-A may be unavailable. As such, LPWAN Gateway device 410-A has no ability to send messages to and from either the traditional LPWAN node 440 or the wired devices 430 via the LPWAN Protocol Network 450. Even though the LPWAN Gateway may still retain the functionality to communicate with the wired devices 430, via wired connection 431, and the LPWAN nodes 440 via wireless connection 441, the lack of backhaul connection 451 means those communications would never be able to reach the backend application 460.

The techniques described herein may allow for the LPWAN Gateway Device 410-A with the failed backhaul connection 451 to utilize other, nearby LPWAN Gateway devices 410-B, C. A virtual node(s) 413 may be created for the wired devices on the LPWAN Gateway device 410-A. The virtual node 413 created for the wired devices may then connect to non-failed LPWAN Gateway devices. For example, as shown virtual node 413 may connect to LPWAN Gateway Device 410-C via standard wireless LPWAN protocols. What should be understood is that when virtual node 413 connects to LPWAN Gateway Device 410-C, it is connecting as an actual wireless node (e.g. utilizing the RF capabilities of the LPWAN Gateway Device 410-A). Because the virtual node is joining the network via a wireless connection, the join would not include a request to join as a node that does not require RF management, even though the virtual node is being used to control wired devices.

In the case of standard LPWAN nodes 440, if the node is close enough to another LPWAN Gateway device, the node may simply connect to the other LPWAN Gateway device as normal. If there are no other LPWAN gateway devices within a close enough proximity, a virtual LPWAN node may be created for the traditional LPWAN node 440. The virtual LPWAN node 414 may then connect to another LPWAN Gateway device 410-B via a wireless connection (e.g. just as LPWAN node 413 connected to LPWAN Gateway device 410-C). As above, the virtual node would join as a node that requires RF management.

In yet another implementation (not shown) when the backhaul capabilities of LPWAN Gateway Device 410-A fail, the entire gateway device may be considered a single LPWAN node and may join one of the other LPWAN Gateway Devices (e.g. LPWAN Gateway Device 410-B) as a node that require RF management. Thus, communications destined for wired devices 430 and LPWAN devices 440 will be addressed to the LPWAN address that represents the LPWAN Gateway device 410-A. LPWAN Gateway Device 410-A may the relay messages between the devices 430, 440 and LPWAN protocol network 450. When the entire gateway joins as an LPWAN node, it may utilize a new type of join request that indicates all of the nodes (e.g. both traditional LPWAN nodes and virtual LPWAN nodes) that will be communicated with via the gateway. Some of those nodes (e.g. the traditional LPWAN nodes) are indicated as needing RF management while others (the virtual LPWAN nodes) do not need RF management. The connection to the gateway itself will require RF management.

Figure 5:
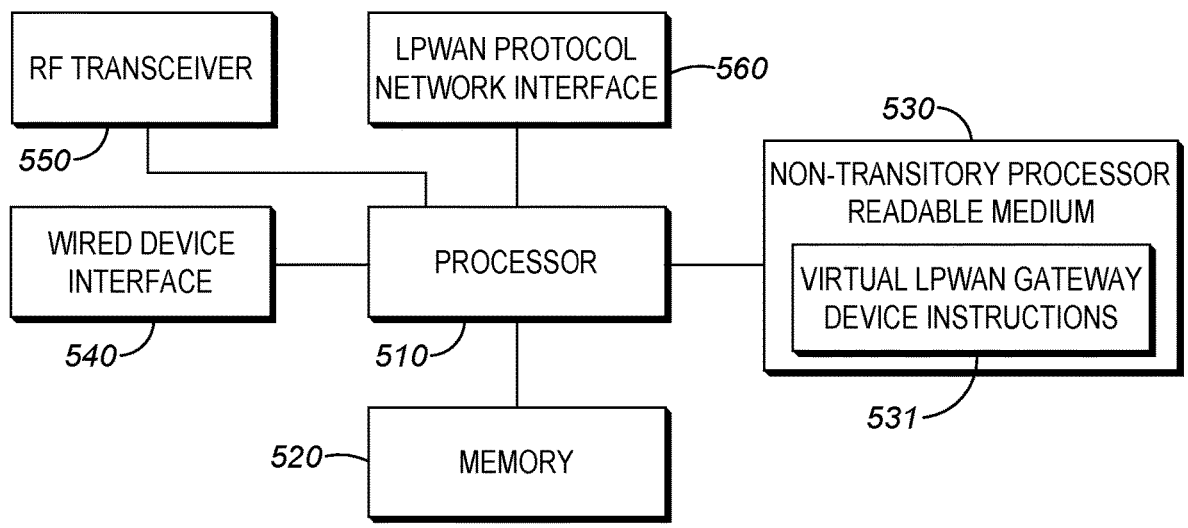
FIG. 5 is an example of a device that may implement the virtual LPWAN nodes in a LPWAN gateway techniques described herein.

FIG. 5 is an example of a device that may implement the virtual LPWAN nodes in a LPWAN gateway techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. Virtual LPWAN Gateway Device Instructions, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, wired device interface 540, RF transceiver 550, and LPWAN Protocol Network Interface 560.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include Virtual LPWAN Gateway Device Instructions 531. The Virtual LPWAN Gateway Device instructions may cause device 500 to implement the functionality of a LPWAN Gateway Device 110 as described above. The functionality provided by the Virtual LPWAN Gateway Device instructions is described throughout the specification, including places such as blocks 205-245 of FIG. 2 and blocks 305-355 of FIG. 3

The device 500 may include wired device interface 540 through which device 500 may connect to wired devices. The particular physical form factor of the connection is relatively unimportant. The wired signals may be of any type (e.g. analog, digital, etc.) using any known wired protocol (e.g. binary, RS232, serial peripheral interface, universal serial bus, etc.). What should be understood is that wired devices may be coupled to device 500 via the wired device interface.

Device 500 may also include RF transceiver 550 through which traditional LPWAN nodes may be connected. RF Transceiver 550 may implement any known LPWAN protocol. For example, the RF transceiver may implement the LoRaWAN protocol to connect with LoRa devices. The techniques described herein do not generally change the functionality provided by traditional LPWAN nodes, but rather introduce the new virtual LPWAN nodes that do not require RF management.

Device 500 may also include LPWAN protocol network interface 560, which may allow device 500 to communicate with a backend application via a LPWAN protocol network. Once again, the techniques described herein do not intend to alter the operation of traditional LPWAN protocol networks, but instead provide the ability to connect to wired devices, which are not LPWAN devices, to communicate via LPWAN protocols.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A reference to at least one of A and B means one or more of element A alone, one or more of element B alone, or any combination of any number of elements A and B together. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling wired devices to be coupled to a Low Power Wide Area Network (LPWAN), the method comprising:
   identifying, at a LPWAN gateway device, a first wired device that is coupled to the LPWAN gateway device via a first wired medium;
   instantiating, at the LPWAN gateway device, a first virtual node, the first virtual node assigned to provide protocol conversion between the LPWAN and the first wired device;
   transmitting from the first virtual node at the LPWAN gateway, a request to join the LPWAN as a node that does not require Radio Frequency (RF) management; and
   identifying, at the LPWAN gateway device, a second wired device that is coupled to the LPWAN gateway device via a second wired medium;
   associating the second wired device with the first virtual node;
   receiving, at the first virtual node, from the LPWAN, a control message;
   determining if the control message is destined for the first wired device or the second wired device;
   converting the control message to a first wired protocol or a second wired protocol based on the determination; and
   sending the converted control message to the first wired device or the second wired device over the first wired medium or second wired medium based on the determination.

2. The method of claim 1 wherein the LPWAN is a Long Range Wide Area Network (LoRaWAN).

3. The method of claim 1 further comprising:
   receiving, at the first virtual node, from the LPWAN, a control message for the first wired device via a LPWAN protocol;
   converting, by the first virtual node, the control message to a wired protocol used by the first wired device over the first wired medium; and
   sending the converted control message to the first wired device via the first wired medium.

4. The method of claim 1 further comprising:
   receiving, at the first virtual node, a device data message from the first wired device via a first wired protocol over the first wired medium;
   converting, by the first virtual node, the device data message from the first wired device to a LPWAN protocol; and
   sending the converted device data message to the LPWAN.

5. The method of claim 1 further comprising:
   identifying, at the LPWAN gateway device, a second wired device that is coupled to the LPWAN gateway device via a second wired medium;
   instantiating, at the LPWAN gateway device, a second virtual node, the second virtual node assigned to provide protocol conversion between the LPWAN and the second wired device; and
   transmitting, from the second virtual node at the LPWAN gateway, a request to join the LPWAN as a node that does not require RF management.

6. The method of claim 1 further comprising:
   receiving, at the first virtual node, a device data message from one of the first wired device or the second wired device via one of the first wired medium or the second wired medium;
   converting, by the first virtual node, the data message to a LPWAN protocol, wherein the converted data message includes an indication of which of the first wired device or the second wired device the data message was received from; and
   sending the converted data message to the LPWAN.

7. A system comprising:
   a processor; and
   a memory coupled to the processor, the memory containing a set of instructions thereon that when executed by the processor cause the processor to:
   identify, at a Low Power Wide Area Network (LPWAN) gateway device, a first wired device that is coupled to the LPWAN gateway device via a first wired medium;
   instantiate, at the LPWAN gateway device, a first virtual node, the first virtual node assigned to provide protocol conversion between the LPWAN and the first wired device;
   transmit from the first virtual node at the LPWAN gateway, a request to join the LPWAN as a node that does not require Radio Frequency (RF) management; and
   identify, at the LPWAN gateway device, a second wired device that is coupled to the LPWAN gateway device via a second wired medium;
   associate the second wired device with the first virtual node;
   receive, at the first virtual node, from the LPWAN, a control message;
   determine if the control message is destined for the first wired device or the second wired device;

convert the control message to a first wired protocol or a second wired protocol based on the determination; and send the converted control message to the first wired device or the second wired device over the first wired medium or second wired medium based on the determination.

8. The system of claim 7 wherein the LPWAN is a Long Range Wide Area Network (LoRaWAN).

9. The system of claim 7 further comprising instructions that cause the processor to:

receive, at the first virtual node, from the LPWAN, a control message for the first wired device via a LPWAN protocol;

convert, by the first virtual node, the control message to a wired protocol used by the first wired device over the first wired medium; and send the converted control message to the first wired device via the first wired medium.

10. The system of claim 7 further comprising instructions that cause the processor to:

receive, at the first virtual node, a device data message from the first wired device via a first wired protocol over the first wired medium;

convert, by the first virtual node, the device data message from the first wired device to a LPWAN protocol; and send the converted device data message to the LPWAN.

11. The system of claim 7 further comprising instructions that cause the processor to:

identify, at the LPWAN gateway device, a second wired device that is coupled to the LPWAN gateway device via a second wired medium;

instantiate, at the LPWAN gateway device, a second virtual node, the second virtual node assigned to provide protocol conversion between the LPWAN and the second wired device; and transmit, from the second virtual node at the LPWAN gateway, a request to join the LPWAN as a node that does not require RF management.

12. The system of claim 7 further comprising instructions that cause the processor to:

receive, at the first virtual node, a device data message from one of the first wired device or the second wired device via one of the first wired medium or the second wired medium;

convert, by the first virtual node, the data message to a LPWAN protocol, wherein the converted data message includes an indication of which of the first wired device or the second wired device the data message was received from; and send the converted data message to the LPWAN.

13. A non-transitory processor readable medium containing a set of instructions thereon that when executed by a processor cause the processor to:

identify, at a Low Power Wide Area Network (LPWAN) gateway device, a first wired device that is coupled to the LPWAN gateway device via a first wired medium;

instantiate, at the LPWAN gateway device, a first virtual node, the first virtual node assigned to provide protocol conversion between the LPWAN and the first wired device; and transmit from the first virtual node at the LPWAN gateway, a request to join the LPWAN as a node that does not require Radio Frequency (RF) management; and identify, at the LPWAN gateway device, a second wired device that is coupled to the LPWAN gateway device via a second wired medium;

associate the second wired device with the first virtual node;

receive, at the first virtual node, from the LPWAN, a control message;

determine if the control message is destined for the first wired device or the second wired device;

convert the control message to a first wired protocol or a second wired protocol based on the determination; and send the converted control message to the first wired device or the second wired device over the first wired medium or second wired medium based on the determination.

14. The medium of claim 13 further comprising instructions that cause the processor to:

receive, at the first virtual node, from the LPWAN, a control message for the first wired device via a LPWAN protocol;

convert, by the first virtual node, the control message to a wired protocol used by the first wired device over the first wired medium; and send the converted control message to the first wired device via the first wired medium.

15. The medium of claim 13 further comprising instructions that cause the processor to:

receive, at the first virtual node, a device data message from the first wired device via a first wired protocol over the first wired medium;

convert, by the first virtual node, the device data message from the first wired device to a LPWAN protocol; and send the converted device data message to the LPWAN.

16. The medium of claim 13 further comprising instructions that cause the processor to:

identify, at the LPWAN gateway device, a second wired device that is coupled to the LPWAN gateway device via a second wired medium;

instantiate, at the LPWAN gateway device, a second virtual node, the second virtual node assigned to provide protocol conversion between the LPWAN and the second wired device; and transmit, from the second virtual node at the LPWAN gateway, a request to join the LPWAN as a node that does not require RF management.

17. The medium of claim 13 further comprising instructions that cause the processor to:

receive, at the first virtual node, a device data message from one of the first wired device or the second wired device via one of the first wired medium or the second wired medium;

convert, by the first virtual node, the data message to a LPWAN protocol, wherein the converted data message includes an indication of which of the first wired device or the second wired device the data message was received from; and send the converted data message to the LPWAN.

* * * * *